United States Patent Office.

DAVID BROOKS, OF PHILADELPHIA, PENNSYLVANIA.

Letters Patent No. 114,911, dated May 16, 1871.

IMPROVEMENT IN GALVANIC BATTERIES.

The Schedule referred to in these Letters Patent and making part of the same.

I, DAVID BROOKS, of Philadelphia, county of Philadelphia, State of Pennsylvania, have invented an Improvement in Galvanic Batteries, of which the following is a specification.

Nature and Object of the Invention.

My invention consists of the use, in the manner hereafter described, of paraffine, paraffine-wax, or light oily matter, in connection with a galvanic battery, for the purpose of insulating the latter and of preventing the evaporation of the solution.

General Description.

I have ascertained that if a small quantity of paraffine or melted paraffine-wax be poured upon the solution in a galvanic battery it will have the effect of insulating the battery, and of preventing the evaporation of the solution and the formation of crystals on the sides of the vessel above the solution.

The paraffine, being much lighter then the solution, floats upon the surface of the same, the quantity of paraffine used being sufficient to entirely cover the solution.

Coal-oil, or in fact any oil sufficiently light to float upon the surface of the solution, would in a measure answer the purpose; but I prefer to employ paraffine, as, owing to its non-conducting properties, it effects an almost perfect insulation of the battery.

My invention can be used in connection with any of the batteries employed in telegraphing, and for other purposes.

Claim.

The application to galvanic batteries of paraffine or its equivalent, substantially as and for the purpose set forth.

In testimony whereof I have signed my name to this specification in the presence of two subscribing witnesses.

DAVID BROOKS.

Witnesses:
WM. A. STEEL,
FRANKLIN B. RICHARDS.